United States Patent
Hallouin et al.

(10) Patent No.: US 11,492,911 B2
(45) Date of Patent: Nov. 8, 2022

(54) TURBINE STATOR VANE COMPRISING AN INNER COOLING WALL PRODUCED BY ADDITIVE MANUFACTURING

(71) Applicant: SAFRAN HELICOPTER ENGINES, Bordes (FR)

(72) Inventors: Baptiste Hallouin, Moissy-Cramayel (FR); Jean-Luc Breining, Moissy-Cramayel (FR); Damien Laberny, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 16/982,727

(22) PCT Filed: Mar. 26, 2019

(86) PCT No.: PCT/FR2019/050678
§ 371 (c)(1),
(2) Date: Sep. 21, 2020

(87) PCT Pub. No.: WO2019/186046
PCT Pub. Date: Oct. 3, 2019

(65) Prior Publication Data
US 2021/0003015 A1 Jan. 7, 2021

(30) Foreign Application Priority Data
Mar. 29, 2018 (FR) ...................... 1852764

(51) Int. Cl.
*F01D 5/14* (2006.01)
*F01D 5/18* (2006.01)
(Continued)

(52) U.S. Cl.
CPC ............ *F01D 5/147* (2013.01); *F01D 5/187* (2013.01); *F01D 5/28* (2013.01); *B33Y 10/00* (2014.12); *B33Y 80/00* (2014.12); *F05D 2230/20* (2013.01)

(58) Field of Classification Search
CPC .......... F01D 5/147; F01D 5/187; F01D 5/188; F01D 5/189; F01D 5/18; F01D 5/081;
(Continued)

(56) References Cited

U.S. PATENT DOCUMENTS

| 6,435,813 B1 * | 8/2002 | Rieck, Jr. | ............... F01D 5/188 |
| | | | 415/115 |
| 8,864,438 B1 * | 10/2014 | Lee | ......................... F01D 5/188 |
| | | | 415/1 |

(Continued)

FOREIGN PATENT DOCUMENTS

| EP | 3 051 066 A1 | 8/2016 |
| FR | 2 893 080 A1 | 5/2007 |

(Continued)

OTHER PUBLICATIONS

International Search Report dated May 17, 2019 in PCT/FR2019/050678 filed on Mar. 26, 2019, citing documents AA-AE and AO-AS therein, 3 pages.

(Continued)

*Primary Examiner* — Eric J Zamora Alvarez
(74) *Attorney, Agent, or Firm* — Oblon, McClelland, Maier & Neustadt, L.L.P.

(57) ABSTRACT

A stator vane of a turbine of a gas turbine engine, including an outer platform and an inner platform between which there extends an outer wall forming an outer skin, wherein it includes an inner wall, forming an inner skin, facing the outer wall so as to define an inter-skin cavity between the outer wall and the inner wall, the inner wall including a plurality of cooling orifices for impingement cooling of the outer wall, the outer wall and inner wall being produced by additive manufacturing.

5 Claims, 3 Drawing Sheets

(51) Int. Cl.
*F01D 5/28* (2006.01)
*B33Y 80/00* (2015.01)
*B33Y 10/00* (2015.01)

(58) Field of Classification Search
CPC . F01D 5/28; F01D 9/065; F01D 9/041; F01D 9/02; F01D 9/06; F01D 25/12; B33Y 10/00; B33Y 80/00; F05D 2230/20; F05D 2260/201; F05D 2260/22141; F05D 2240/121; F05D 2250/185; F05D 2260/205
See application file for complete search history.

(56) References Cited

U.S. PATENT DOCUMENTS

| | | |
|---|---|---|
| 2016/0151829 A1 | 6/2016 | Propheter-Hinckley et al. |
| 2016/0158889 A1* | 6/2016 | Carter ................ C30B 11/005 219/76.12 |
| 2016/0222792 A1 | 8/2016 | King |
| 2018/0193920 A1 | 7/2018 | Vollebregt et al. |
| 2018/0230836 A1* | 8/2018 | Tibbott ................ F01D 9/065 |
| 2018/0252108 A1 | 9/2018 | King |
| 2019/0022743 A1 | 1/2019 | Rollinger et al. |

FOREIGN PATENT DOCUMENTS

| | | |
|---|---|---|
| FR | 3 037 974 A1 | 12/2016 |
| FR | 3 039 199 A1 | 1/2017 |
| FR | 3 044 038 A1 | 5/2017 |
| WO | WO 2015/009448 A1 | 1/2015 |
| WO | WO 2017/137709 A1 | 8/2017 |

OTHER PUBLICATIONS

French Preliminary Search Report dated Oct. 9, 2018 in French Application 1852764 filed on Mar. 29, 2018, citing documents AO-AS therein, 1 page.

* cited by examiner

TURBINE STATOR VANE COMPRISING AN INNER COOLING WALL PRODUCED BY ADDITIVE MANUFACTURING

TECHNICAL FIELD

The present invention relates to the general field of turbomachines, and more particularly to the field of turbine distributor vanes, in particular high pressure turbines, of a gas turbine engine.

The invention applies to all types of land or aeronautical turbomachines, and in particular to aircraft turbomachines such as turbojet engines and turboprop engines.

Thus, it relates to a turbine distributor vane of a gas turbine engine, including an inner cooling wall produced by additive manufacturing, a turbine including a plurality of such vanes, a turbomachine including such turbine, as well as a method for manufacturing such a distributor vane.

PRIOR ART

A high pressure turbine of a gas turbine engine conventionally includes one or more rows of turbine vanes spaced circumferentially all around the rotor of the turbine. It also comprises a distributor assembly allowing to direct the gas flow from the combustion chamber to the turbine vanes at an appropriate angle and speed in order to rotate the turbine vanes and rotor.

The distributor assembly generally includes a plurality of guide vanes which extend radially between lower and upper annular platforms and which are circumferentially spaced from each other. These distributor vanes are in direct contact with the hot gases from the combustion chamber. They are subjected to very high temperatures and therefore need to be cooled.

In order to be able to effectively cool a distributor vane, it is desirable to have a cooling device that is thermally efficient to allow high thermal power to be dissipated by using moderate air flow rate.

In addition, it is desirable to have such a cooling device which is tight. The tightness allows to ensure that the air mobilised is only dedicated for the cooling of the vane: the higher the tightness of the device, the greater its overall efficiency, the latter being an increasing function of the tightness and the thermal efficiency of the device.

Furthermore, it is desirable to have a compact cooling device. Indeed, the integration of the cooling device must minimise its impact on the space requirement of the engine.

It is also desirable to have a cooling device which is economically advantageous. The cost of producing it must be as low as possible.

The prior art already teaches solutions for cooling turbine distributor vanes, such as, for example, French patent applications FR 2 893 080 A1 and FR 3 039 199 A1.

Thus, one of the most widely used solutions today is to use a multi-drilled sheet insert to cool the vane by cooling air impacts.

FIG. 1 very schematically illustrates, in section, an example of cooling of a distributor vane 1' by an insert 2 which is multi-drilled with impact cooling orifices 3.

In this FIG. 1, the arrows AF represent the flowing of the cooling air flow which supplies the insert 2 then passes through the orifices 3 to perform the cooling by impact of the wall of the vane 1'. The arrows PF represent the purge of the remainder of the cooling flow.

The insert 2 thus constitutes a cavity supplied with cold air. Under the action of a pressure gradient, this air is then routed outside the insert 2 through the drillings 3, thus forming a set of jets which burst onto the wall of the vane 1'.

This type of air impact cooling is particularly effective. However, the use of an insert, which forms an add-on part, has several disadvantages.

First of all, the connection between the insert and the distributor rim is not necessarily tight. Thus, FIG. 2 illustrates the appearance of leaks, schematised by the arrows FU, generated by the presence of an add-on insert 2.

The inserts 2 are generally welded to a distributor rim 4. The welding can be a continuous or a spot welding. In the latter case, the connection between the insert 2 and the distributor is permeable, which then causes a leak at this interface which reduces the efficiency of the cooling.

Moreover, mounting the insert may require cumbersome arrangements.

Furthermore, the insert solution is expensive. The connection between the insert and the distributor rim is generally made by welding or adjusting the shapes in contact. Welding is an expensive operation, especially if the weld is continuous, and depending on the substrate, it may include microcracks. Adjusting the shapes in contact is also expensive. In addition, the inserts must be pierced, which complicates their implementation.

In addition, the control of the distance between the insert and the distributor vane is not necessarily high. FIG. 3 allows to illustrate the impact distance d between the distributor vane 1' and the insert 2. This distance d is generally around 1 mm and influences the cooling efficiency. The control of this distance d can be degraded by the deformations induced by the welding or by some geometric deviations such as an insert perimeter that is too high.

DESCRIPTION OF THE INVENTION

The purpose of the invention is therefore to at least partially remedy the needs mentioned above and the disadvantages relating to the embodiments of the prior art.

The object of the invention is thus, according to one of its aspects, a turbine distributor vane, in particular a high pressure turbine, of a gas turbine engine, including an outer platform and an inner platform between which extends an outer wall, forming an outer skin, characterised in that it includes an inner wall, forming an inner skin, facing the outer wall so as to define an inter-skin cavity between the outer and inner walls, the inner wall including a plurality of cooling orifices for cooling the outer wall by impact, the outer and inner walls being produced by additive manufacturing.

The distributor vane according to the invention may further include one or more of the following features taken separately or in any possible technical combination.

The distributor vane may include a hook, in particular at the outer platform, allowing to connect the vane to a turbine ring, and the inner wall can be radially superimposed on the hook, in particular on the front end of the hook. Advantageously, the axial space requirement of the vane can thus be reduced.

The distributor vane according to the invention can preferably be made in one piece by additive manufacturing.

The orifices for cooling the inner wall can be produced by additive manufacturing.

The outer and inner walls may preferably be made of the same material and there may be a continuity of material between them.

A junction between the outer and inner walls can be formed radially at the outer platform.

Moreover, according to another of its aspects, a further object of the invention is a turbine, in particular a high pressure turbine, for a gas turbine engine, characterised in that it includes a plurality of distributor vanes as defined above.

In addition, according to another of its aspects, an object of the invention is also a turbomachine, characterised in that it includes a turbine as defined above.

In addition, according to another of its aspects, an object of the invention, is a method for manufacturing a distributor vane as defined above, characterised in that the outer and inner walls of the vane are produced by an additive manufacturing method, in particular by laser fusion on a bed of metal powder.

The distributor vane, the turbine, the turbomachine and the manufacturing method according to the invention can include any of the features set out in the description, taken separately or in any technically possible combination with other features.

BRIEF DESCRIPTION OF THE DRAWINGS

The invention will be better understood upon reading the detailed description which follows, of an example of a non-limiting embodiment thereof, as well as upon examining the schematic and partial figures of the appended drawing, on which.

In all of these figures, identical references can designate identical or similar elements.

In addition, the different portions shown in the figures are not necessarily on a uniform scale, to make the figures more readable.

DETAILED DESCRIPTION OF A PARTICULAR EMBODIMENT

Figure 1:
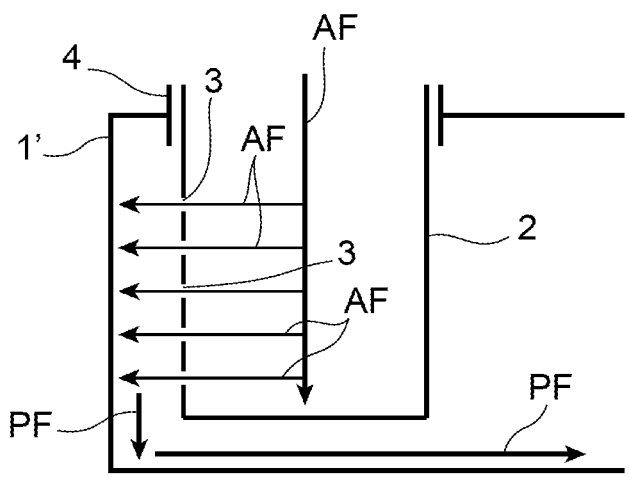
FIG. 1 very schematically illustrates, in section, an example of cooling a distributor vane by a multi-drilled insert with impact cooling orifices.
Figure 2:
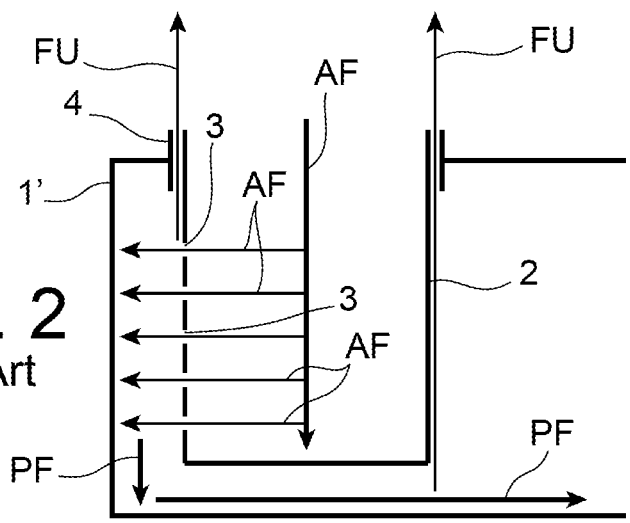
FIG. 2 illustrates the appearance of leaks generated by the presence of an insert added onto the vane of FIG. 1.
Figure 3:
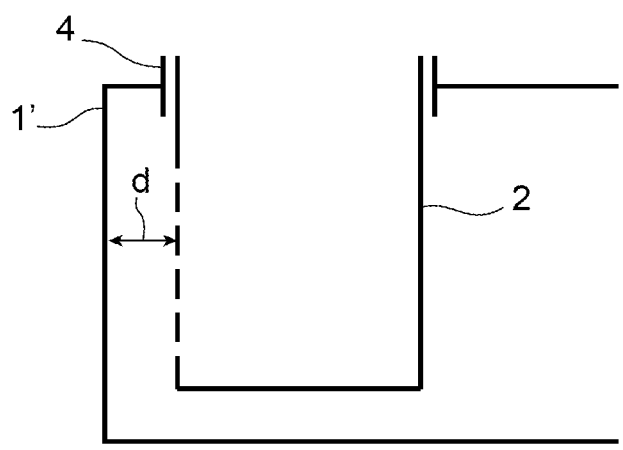
FIG. 3 illustrates the impact distance between the distributor vane and the insert on the vane of FIG. 1, FIG. 4 partially shows, in a perspective and sectional view, an example of a distributor vane according to the invention, FIG. 5 very schematically illustrates, in section, the operation of the vane of FIG. 4, and FIGS. 6A to 6C schematically illustrate, in partial section, the cases of distributor vanes according to the prior art (FIG. 6A), according to the invention (FIG. 6B), and the comparison between the two in terms of space requirement (FIG. 6C).

FIGS. 1 to 3 have been described above in the part relating to the prior art and to the technical background of the invention.

Figure 4:
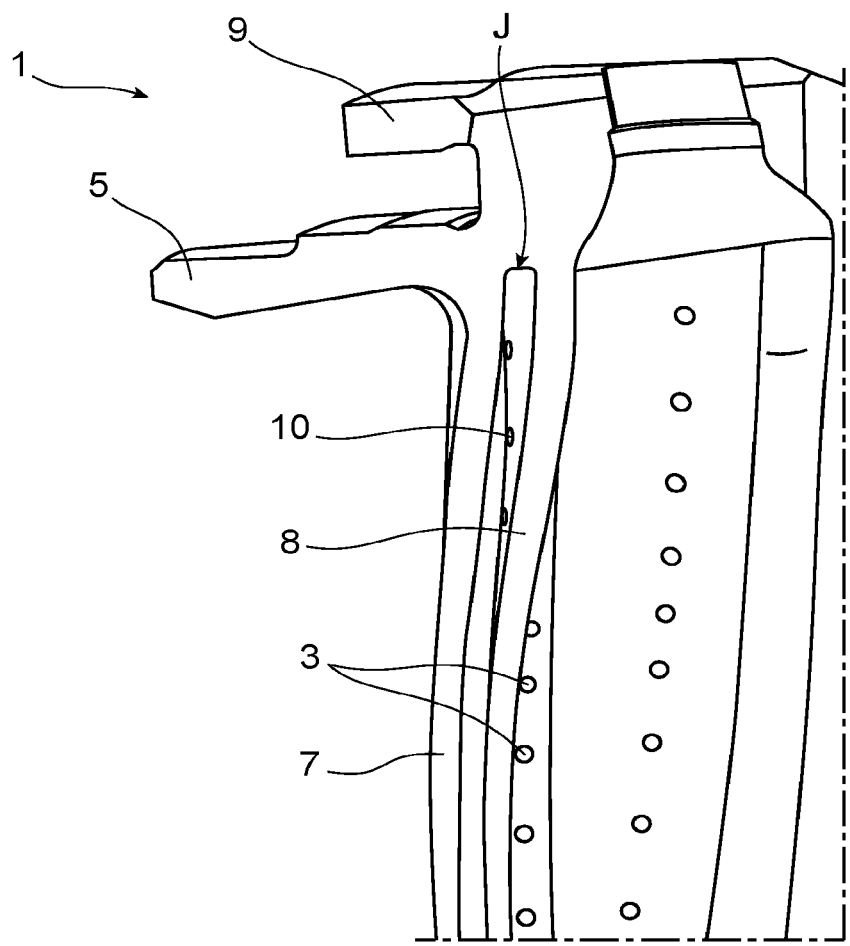
Figure 5:
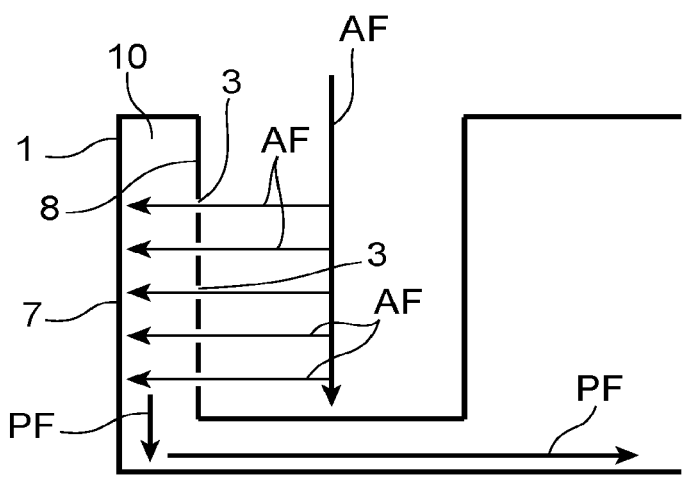

FIG. 4 partially shows, in a perspective view and in section, an example of a distributor vane 1 in accordance with the invention, and FIG. 5 very schematically illustrates, in section, the operation of the vane of FIG. 4.

In order to be able to overcome the disadvantages of the solutions of the prior art presented above, based essentially on the use of an insert, the invention advantageously uses the additive manufacturing method, for example laser melting on a bed of metal powder, in order to integrate a cooling skin with the vane 1. Thus, the distributor vane 1 becomes an integrated double-skin vane ensuring cooling by air jet impacts.

Figure 6A:
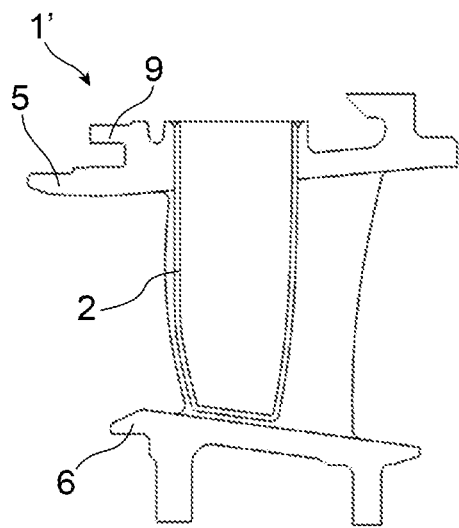
Figure 6B:
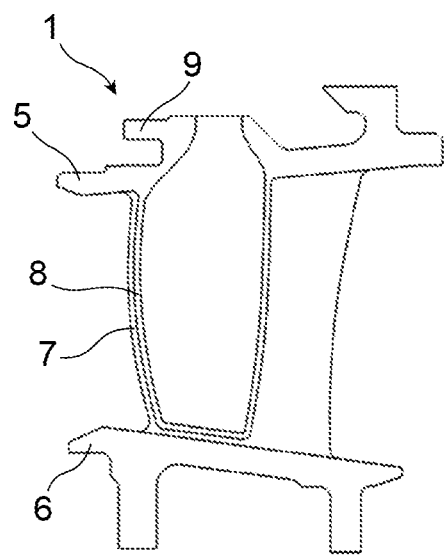

Thus, with reference to FIG. 4, the distributor vane 1 includes an outer platform 5 and an inner platform 6, visible in FIG. 6B, between which extends an outer wall 7, which forms an outer skin.

Advantageously, the vane 1 is provided with an inner wall 8, which forms an inner cooling skin integrated by additive manufacturing. In this way, there is a continuity of material between the inner skin and the distributor rim without having to resort to welding.

This inner skin 8 allows to cool the outer skin 7 which is in contact with the hot gases of the aerodynamic flow path. For this purpose, the inner skin 8 includes cooling orifices 3 which project the cooling air by impact on the outer skin 7.

These cooling orifices 3 are obtained directly by additive manufacturing. They allow the air jets to be oriented towards the areas to be cooled.

The outer 7 and inner 8 skins define therebetween an inter-skin cavity 10 wherein the cooling air from the cooling orifices 3 circulates before cooling the outer skin 7 by impact.

Advantageously, the entire vane is obtained by additive manufacturing. The junction J between the outer 7 and inner 8 skins is located radially near the outer platform 5.

Note also that in FIG. 4, the reference 9 designates a front hook of the distributor which allows the part to be connected to the turbine ring.

The advantages of the proposed solution mainly result from the integration of a cooling skin with the vane by additive manufacturing. Thus, the connection between the inner skin and the rim of the distributor is impermeable, which makes the proposed cooling device tight.

Figure 6C:
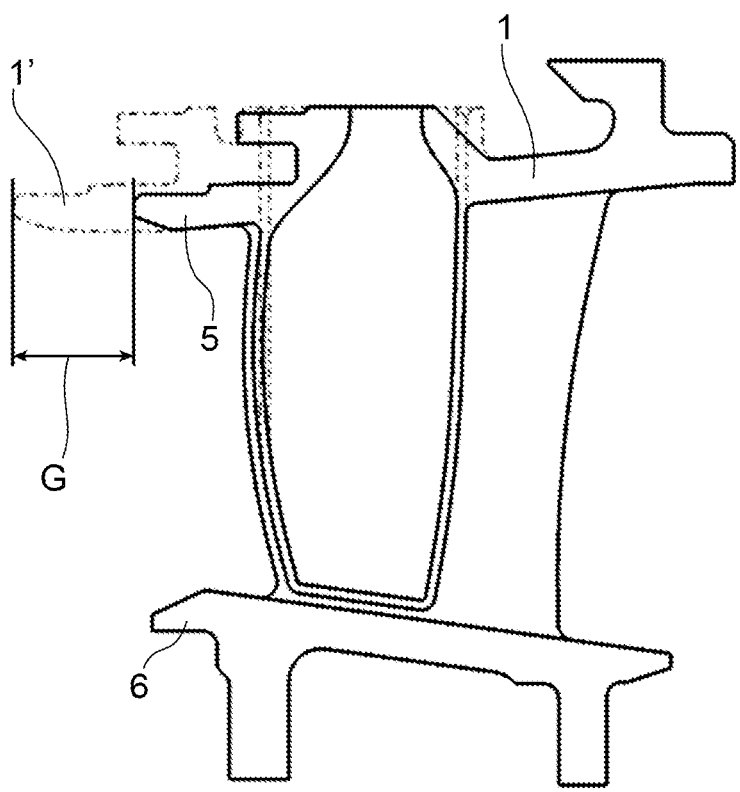

In addition, it is not necessary to provide arrangements which make possible or facilitate the mounting of the inner cooling skin. It is thus possible to design very compact distributors. By way of examples, FIGS. 6A to 6C schematically illustrate, in partial section, the cases of distributor vanes according to the prior art (FIG. 6A), according to the invention (FIG. 6B), and the comparison between the two in terms of space requirement (FIG. 6C).

FIG. 6A shows the conventional embodiment of a vane 1' with the presence of an insert 2. In FIG. 6B, the vane 1 includes the double skin 7, 8 in accordance with the invention. In FIG. 6C which compares the vanes 1' according to the prior art and 1 according to the invention, it is seen that the inner skin 8 is integrated under the front hook 9 of the distributor. In particular, the end of the front hook 9 is radially superimposed on the inner skin 8. This allows to reduce the axial space requirement with a gain in size G, and thus to reduce the mass of the engine, increasing its efficiency.

In addition, the solution proposed by the invention is economical because the expensive operations of welding and drilling an insert are removed.

Moreover, it is possible to have a high degree of control over the distance between the inner cooling skin 8 and the outer skin 7 of the vane 1, in other words over the axial dimension of the inter-skin cavity 10. The cooling efficiency is therefore optimal.

Of course, the invention is not limited to the exemplary embodiment which has just been described. Various modifications can be made thereto by a person skilled in the art.

The invention claimed is:
1. A turbine distributor vane of a gas turbine engine, comprising:
- an outer platform;
- an inner platform;
- an outer wall extending between the outer platform and the inner platform, the outer wall forming an outer skin;
- an inner wall forming an inner skin, the inner wall facing the outer wall so as to define an inter-skin cavity between the outer and inner walls, the inner wall including a plurality of cooling orifices for cooling the outer wall by impact; and
- a hook provided at the outer platform,
- wherein the vane is a single monolithic piece produced by additive manufacturing,
- wherein an upstream end of the hook is downstream of an upstream end of the inner platform, and
- wherein the inner skin is integrated under the hook such that the upstream end of the hook is radially superimposed on a portion of the inner skin.

2. The vane according to claim 1, wherein a junction between the outer and inner walls is formed at the outer platform.

3. A turbine of a gas turbine engine, comprising a plurality of distributor vanes according to claim 1.

4. A turbomachine, comprising the turbine according to claim 3.

5. A method for manufacturing the distributor vane according to claim 1, wherein the vane is produced by laser melting on a bed of metal powder.

* * * * *